United States Patent
Reimer (10) Patent No.: US 7,626,754 B2
(45) Date of Patent: Dec. 1, 2009

(54) LIGHT STEERING USING AN ARRAY OF TUNABLE PHASE DELAY ELEMENTS

(75) Inventor: Christopher Reimer, Ottawa (CA)

(73) Assignee: JDS Uniphase Corporation, Ottawa (CA)

( * ) Notice: Subject to any disclaimer, the term of this patent is extended or adjusted under 35 U.S.C. 154(b) by 0 days.

(21) Appl. No.: 12/190,053

(22) Filed: Aug. 12, 2008

(65) Prior Publication Data

US 2009/0046340 A1  Feb. 19, 2009

Related U.S. Application Data

(60) Provisional application No. 60/955,425, filed on Aug. 13, 2007.

(51) Int. Cl.
  G02F 2/00 (2006.01)
  G02B 6/26 (2006.01)
  G02B 6/42 (2006.01)
(52) U.S. Cl. ............... 359/325; 359/872; 359/877; 385/16; 385/17; 385/20; 342/368; 342/374; 342/375
(58) Field of Classification Search ......... 385/16–23; 359/196.1, 325, 872–874, 876, 877; 342/368, 342/374, 375, 377
See application file for complete search history.

(56) References Cited

U.S. PATENT DOCUMENTS

| 5,428,218 | A  | * | 6/1995  | Toughlian et al. | 250/227.12 |
|-----------|----|---|---------|------------------|------------|
| 6,263,127 | B1 | * | 7/2001  | Dragone et al.   | 385/24     |
| 6,268,952 | B1 | * | 7/2001  | Godil et al.     | 359/291    |
| 6,453,083 | B1 | * | 9/2002  | Husain et al.    | 385/17     |
| 6,498,872 | B2 |   | 12/2002 | Bouevitch et al. | 385/24     |
| 6,618,519 | B2 | * | 9/2003  | Chang et al.     | 385/18     |
| 6,707,959 | B2 |   | 3/2004  | Ducellier et al. | 385/17     |
| 6,741,768 | B2 | * | 5/2004  | Culver et al.    | 385/16     |
| 6,870,985 | B2 | * | 3/2005  | Noonan           | 385/17     |
| 6,975,786 | B1 |   | 12/2005 | Warr et al.      | 385/17     |
| 7,397,980 | B2 |   | 7/2008  | Frisken          | 385/24     |

OTHER PUBLICATIONS

Wagner et al., "Coupling efficiency of optics in single-mode fiber components", Applied Optics, vol. 21, No. 15, 2671-2688, 1982.
Stockley et al., "Liquid crystal spatial light modulator for multispot beam steering", Proceedings of SPIE, 5160, 2004.

* cited by examiner

Primary Examiner—Daniel Petkovsek
(74) Attorney, Agent, or Firm—Teitelbaum & MacLean; Neil Teitelbaum; Doug MacLean (57) ABSTRACT

An apparatus and method for steering a beam of light using an array of tunable optical phase delay elements is presented. The sidelobes of an angular spectrum of light reflected from the array are causing an optical crosstalk. The selected sidelobes are suppressed by perturbing the phase delay pattern of the array elements. The pattern of perturbations is found by linearizing a system of equations describing dependence of the angular spectrum of the reflected light on the phase delays introduced into the wavefront of light by the elements of the array.

22 Claims, 8 Drawing Sheets

LIGHT STEERING USING AN ARRAY OF TUNABLE PHASE DELAY ELEMENTS

CROSS-REFERENCE TO RELATED APPLICATIONS

The present invention claims priority from 60/955,425, filed Aug. 13, 2007, which is incorporated herein by reference.

TECHNICAL FIELD

The present invention is related to optical phased array beam steering, and in particular to devices and methods for controllably distributing a light energy between a plurality of ports or directions, by using an array of tunable phase delay elements.

BACKGROUND OF THE INVENTION

The task of steering a beam of light is fundamental to many photonics applications such as light switching in a fiberoptic communications network, laser marking and material processing, laser printing, optical scanning and signaling, and other applications. One of the most common elements used to provide an optical beam steering function is a tiltable or rotatable mirror. A galvo-driven tiltable mirror, for example, is frequently used in laser printers. A rotatable mirror is often used in barcode scanners. A micro-electro-mechanical (MEMS) mirror is used in fiberoptic switches. When a mirror is rotated, the angle of incidence of the light beam on the mirror changes, which changes the angle of reflection and thus steers the light beam. Another way of interpreting the phenomenon of steering light with a tiltable mirror is to consider changes to the wavefront of a light wave caused by tilting a mirror the wave impinges on. A wavefront is a surface of constant phase of a light wave. It is known that, in an isotropic medium, a light wave tends to propagate in a direction perpendicular to its wavefront. Tilting of the mirror results in introducing a tilt into the wavefront of the reflected light wave and thus results in a change of direction of propagation of the wave.

Instead of a tilting mirror, an array of tunable optical phase delay elements may be used to effect, by generating a linear distribution of an optical phase delay across the surface of the array, a tilt on the wavefront of a monochromatic light wave and thus steer the light wave in a desired direction. Such a steering, which is sometimes called a "phased array beam steering", can be used to control an angle of propagation of an optical beam represented by superposition of light waves traveling in a common direction. An array of deformable or displaceable MEMS elements, or an array of liquid crystal (LC) elements, disposed to interact with the wavefront of the light wave so as to cause a local delay, or retardation, of said wavefront, can be employed to introduce a controllable tilt in the wavefront of light waves impinging on the array and thus to steer the light waves in a desired direction. The mechanism of steering of a light wave by an array of tunable optical phase delay elements is somewhat similar to a mechanism of steering an electromagnetic pulse in a phased-array radar, wherein a controllable phase delay pattern is introduced into signals applied to individual electromagnetic emitters of the radar's phased array, so as to send the resulting electromagnetic pulse in a chosen direction.

In fiberoptic communication networks, it is a common technical problem to switch an optical signal at a particular wavelength from one fiber to another. An array of flat tiltable MEMS mirrors, or alternatively, an array of tunable LC polarization rotators, can be used as a switching element. For example, in U.S. Pat. No. 6,498,872 by Bouevitch et al., which is incorporated herein by reference, an optical configuration for a configurable add/drop multiplexer is described, wherein an array of LC elements is used to attenuate and, or switch optical signals at different wavelengths traveling in an optical fiber, by changing the polarization states of the optical signals at different wavelengths. Further, in U.S. Pat. No. 6,707,959 by Ducellier et al., which is incorporated herein by reference, a wavelength selective switch is described that uses an array of tiltable flat MEMS micro-mirrors to direct optical signals at different wavelengths into a particular of a plurality of output optical fibers, wherein the signals at different wavelengths are switched independently from each other.

One limitation of the wavelength selective switch of U.S. Pat. No. 6,707,959 is that an optical signal at a particular wavelength can only be switched into one output fiber at any moment of time. The reconfigurable add/drop multiplexer described in U.S. Pat. No. 6,498,872 can be used to split the optical power of an output signal between no more than two output optical fibers, because there are only two orthogonal states of polarization of a polarized light. A technology allowing simultaneous coupling of an optical signal into more than two optical waveguides, or, in general, into a selectable subset of a set of output optical waveguides, has some interesting applications. Such reconfigurable broadcasting fiberoptic modules can be used, for example, in "fiber-to-the-home" systems for delivering broadband Internet and, or high definition television services, carried by a single optical fiber, to many individual subscribers. A tiltable flat micromirror or a tunable polarization rotator technologies used in the devices of the abovementioned U.S. Pat. Nos. 6,498,872 and 6,707,959 cannot be readily employed for the purpose of reconfigurable broadcasting, because these technologies are not very suitable for splitting a light beam, in a reconfigurable manner, into a plurality of beams propagating in different directions. Advantageously, an array of tunable phase delay elements can be used to split and redirect a light signal consisting of a plurality of light waves, by properly modifying the wavefront of the light waves, so as to cause them to propagate in an arbitrarily selectable subset of a set of directions corresponding to a set of output fibers of a broadcasting optical switching device.

Spatial light modulators (SLMs) and, in particular, arrays of tunable phase delay elements have been employed as a switching elements in fiberoptic switching modules of the prior art. For example, in U.S. Pat. No. 7,397,980 by Frisken, which is incorporated herein by reference, a dual-source optical wavelength processor is described that uses a phased array for switching an optical signal at a particular wavelength, carried by an input fiber, into one of, or more than one of, output optical fibers. The switching function is performed by generating a linear distribution of optical phase delay across the surface of the array. The wavelength processor of Frisken comprises collimating optics, polarization manipulation optics, and a wavelength dispersing element such as a diffraction grating optically coupled to a prism, which is sometimes called a "grism", for spreading optical signals at different wavelengths and polarizations across a single phased array. As a result of the spreading of the optical signals, the number of phase delay elements available for steering an individual light beam is much smaller than the total number of the elements in the array. The smaller the number of elements available for steering an individual light beam, the larger the diffraction sidelobes in the angular power distribution of the reflected light beam. Disadvantageously, the larger sidelobes create higher levels of an optical crosstalk.

The optical crosstalk in a fiberoptic network is highly undesirable, for the following reason. When a first optical signal at a wavelength $\lambda_1$ is dropped by a wavelength selective switch at a particular location of the network, and another, second optical signal at the same wavelength $\lambda_1$ is added at a downstream location, a residual first optical signal interferes coherently with the second optical signal at the downstream location, which leads to large fluctuations of an optical power level corresponding to low optical power, or a "zero" in a binary stream consisting of "ones" and "zeroes", carried by the second optical signal at the same wavelength $\lambda_1$. Because of the coherent nature of the interference, optical crosstalk in a wavelength selective switch can noticeably degrade performance of a fiberoptic communication link serviced by the switch, even at crosstalk levels as low as −35 dB.

The optical crosstalk problem was recognized in U.S. Pat. No. 6,975,786 by Warr et al., which is incorporated herein by reference, wherein an optical switch having two liquid crystal SLMs is described. In the switch of Warr et al., a light from an input fiber of an input fiber array diffracts on holograms displayed by the SLMs, and the diffracted light couples into a particular of an output fiber array. A crosstalk appears when a light that was intended to follow one path has a residual component that follows another path. According to Warr et al., the crosstalk can be reduced by selecting such set of holograms and such a set of output fiber locations where the optical power of the residual component of light is minimized. This is achieved by going through an iterative process of generating a set of N binary holograms for routing of light into one of N output fibers, calculating an angular distribution of optical power of diffracted light, and adjusting the physical locations of the input and the output fibers to minimize crosstalk into unintended fibers. Disadvantageously, the method of Warr et al. is computation-intensive; it requires the N holograms corresponding to a single input fiber of the input fiber array to be computed in advance and stored in a memory circuitry of the optical switch. Further, disadvantageously, due to optimizing relative fiber positions, the apparatus of Warr et al. is likely to contain output fiber and lenslet arrays with irregular pitch, which is impractical.

Accordingly, it is the goal of the present invention to provide a method for steering light using an array of tunable phase delay elements, wherein the optical power of light propagating in undesired directions is reduced, in comparison with the optical power of light diffracted from an array having the tunable phase delay elements driven so as to generate a linear optical phase delay distribution across the surface of the array. It is also the goal of the present invention to provide an optical switch having an optical signal broadcasting capability, wherein the optical crosstalk is reduced as compared to a crosstalk level in an optical switch having a linear optical phase delay distribution across the array of tunable phase delay elements.

SUMMARY OF THE INVENTION

In accordance with the invention there is provided a method for causing a light wave, having a complex amplitude and a wavefront, to propagate in a subset A of directions selected from a pre-defined set M of directions, while suppressing propagation of the light wave in a subset B of directions selected from the set M, wherein the method comprises the steps of:

(a) providing an array of tunable phase delay elements disposed to interact with the light wave, for modifying the wavefront of the light wave in dependence upon control signals for controlling the phase delay elements;

(b) providing initial control signals for causing the light wave to propagate in the subset A of directions;

(c) determining an initial complex amplitude of a fraction of the light wave propagating in the subset B of directions upon application of the initial control signals to the phase delay elements;

(d) determining perturbations to the initial control signals, for sending, in the subset B of directions, a wave having the modulus of the complex amplitude equal to the modulus of the initial complex amplitude, and the phase of the complex amplitude opposite to the phase of the initial complex amplitude;

(e) applying the perturbations to the initial control signals, so as to produce adapted control signals; and (f) applying the adapted control signals to the phase delay elements, so as to modify the wavefront of the light wave and facilitate propagation thereof in the subset A of directions while suppressing propagation thereof in the subset B of directions.

In accordance with another aspect of the invention there is further provided an apparatus for switching light, comprising:

a set of input ports for inputting a light wave having a wavefront, wherein said set of input ports contains at least one input port;

an array of tunable phase delay elements optically coupled to the set of input ports, for modifying the wavefront of the light wave in dependence upon control signals for controlling the array elements;

a set of output ports for outputting the light wave, optically coupled to the array of tunable phase delay elements, wherein said set of output ports contains at least one output port, and wherein each output port is associated with a direction selected from a set M of directions containing a subset A and a subset B of directions; and a controller for providing the control signals, suitably programmed to switch light by causing the light wave to propagate in the subset A of directions, while suppressing propagation of the light wave in the subset B of directions, according to the above stated method.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 1 to 4, like numbers denote like elements.

Figure 1:
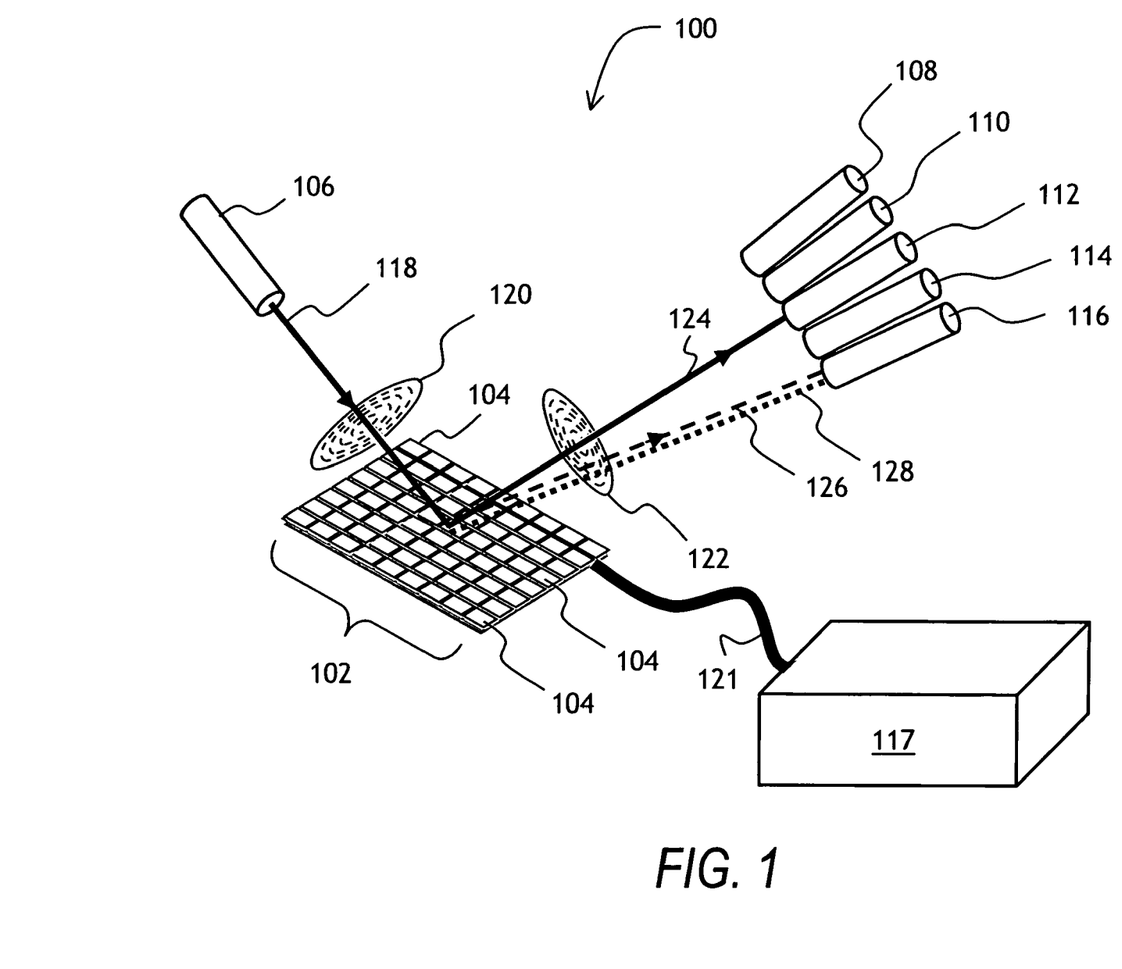
FIG. 1 is a three-dimensional view of an optical switch of the present invention, wherein the switch has a single input port.

Referring to FIG. 1, an optical switch 100 of the present invention is shown. The switch 100 comprises an array 102 of tunable phase delay elements 104; an input port 106 for inputting light; output ports 108 to 116 for outputting light; and a controller 117 for controlling the array 102 through a link 121. A monochromatic light beam 118 originating from the input port 106 impinges on the array 102. Due to the dualistic nature of light, the light beam 118 can be viewed as a light wave having a wavefront 120 and propagating in the direction of the light beam 118. The wavefront 120 is a surface of constant phase of the light wave. The array 102 modifies the wavefront 120 by introducing a pattern of phase delays in dependence upon a set of control signals provided by the controller 117. A wavefront 122 of a reflected light wave propagates towards the output port 112, as shown by a beam 124. However, because of a finite number of the elements 104 introducing phase delays that are constant across the individual elements 104, and because of edge effects and the phase delay errors of the individual elements 104, a small fraction of the impinging beam 118 is directed towards the unintended port 116 as a secondary beam 126, causing crosstalk in the port 116. It is an essential part of the present invention that the controller 117 is suitably programmed to suppress the crosstalk beam 126 by perturbing the phase delay pattern of the array 102 so as to send, in the direction of the beam 126, another beam 128 which effectively cancels the beam 126 due to the phenomenon of destructive interference. A preferred method of determining a set of perturbations for crosstalk suppression will be described in detail below, in a section discussing the mathematical model of light coupling in an optical switch having a phased array.

Figure 2:
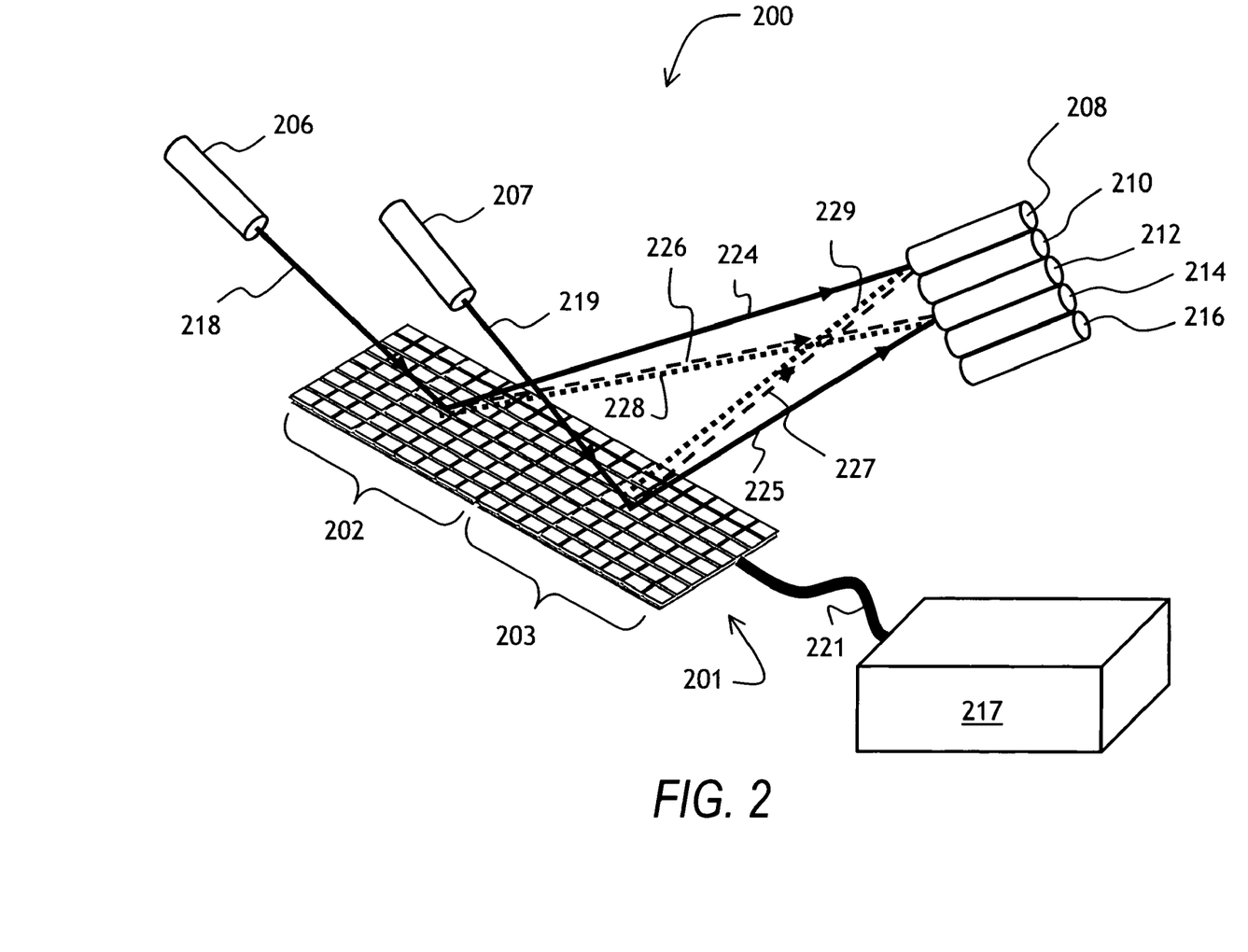
FIG. 2 is a three-dimensional view of an optical switch of the present invention, wherein the switch has two input ports.

Turning now to FIG. 2, an optical switch 200 is shown comprising a phased array 201 for modifying the wavefront, consisting of two sub-arrays 202 and 203; two input ports 206 and 207 for inputting light; output ports 208 to 216 for outputting light; and a controller 217 for controlling the array 201 by sending control signals through a link 221. The difference between the switch 200 of FIG. 2 and the switch 100 of FIG. 1 is that the switch 200 of FIG. 2 has two input ports 206 and 207 emitting two beams 218 and 219, respectively, impinging on the two sub-arrays 202 and 203. Each of the sub-arrays 202 and 203 is disposed to steer its respective beam independently on each other, so as to couple these beams into any of the common output ports 208 to 216. For example, in FIG. 2, a beam 224 reflected from the sub-array 202 is coupled into the output port 208, and a beam 225 reflected from the sub-array 203 is coupled into the output port 212. A crosstalk beam 226 splits from the beam 224 and propagates towards the port 212 causing crosstalk with the beam 225. In order to suppress the crosstalk, the phase delays of elements of the sub-array 202 are adjusted by the controller 217 so as to send a beam 228 towards the port 212. The beam 228 cancels the beam 226, lessening the crosstalk for the port 212. Similarly, a beam 229 cancels the beam 227, lessening the crosstalk for the port 208. The physical phenomenon underlying the cancellation is the destructive interference of light waves comprising the beams 226 and 228; and the beams 227 and 229. Preferably, the controller 217 is suitably programmed to recognize which ports require crosstalk suppression, based on the intended output ports for each of the input ports 206 and 207, and optimize the perturbations to initial control signals applied to tunable phase delay elements of the array 201, such that the crosstalk for the intended output ports, in this example the ports 208 and 212, is suppressed to a larger extent that the extent of suppression of crosstalk for any other output ports shown in FIG. 2.

Figure 3:
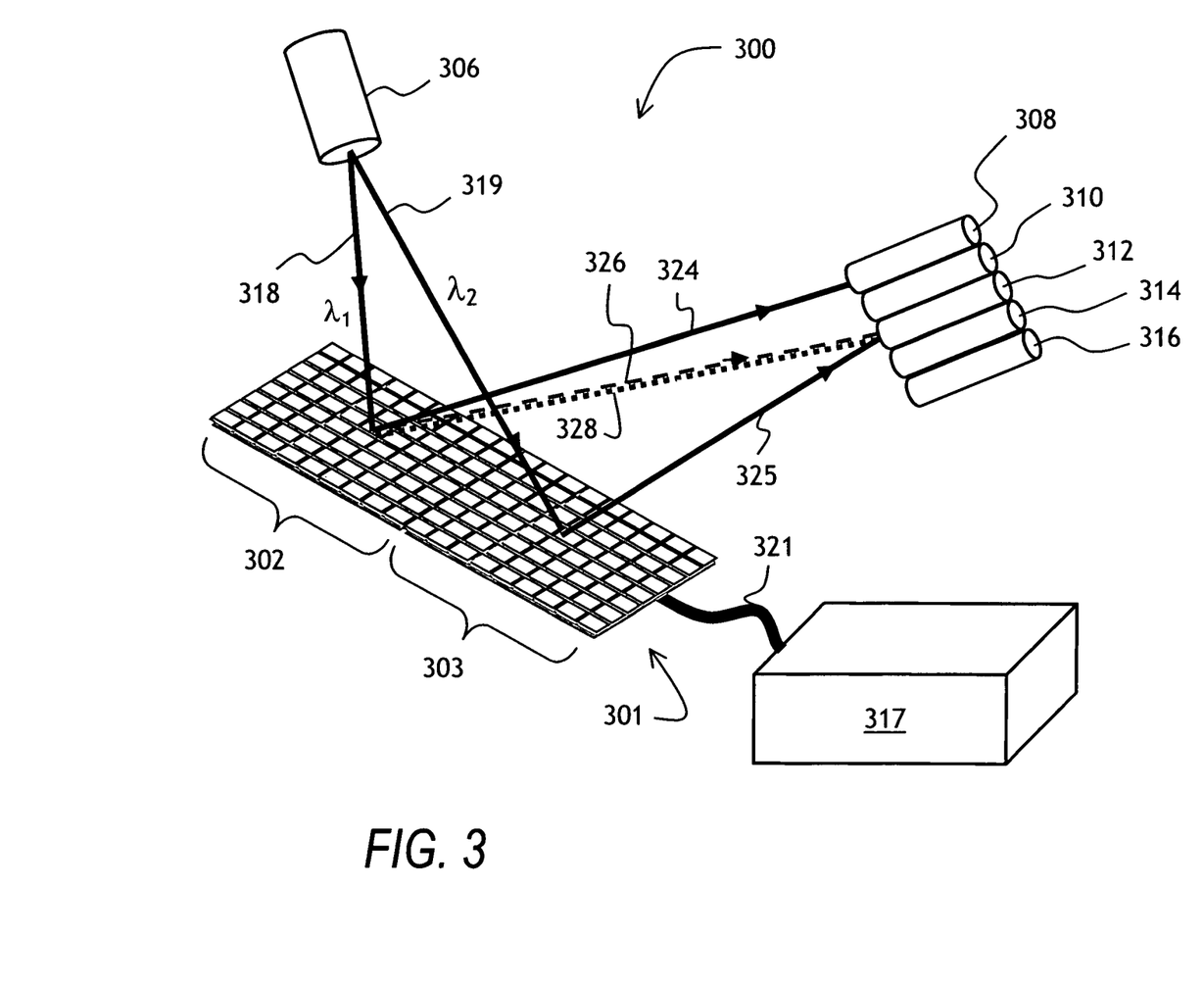
FIG. 3 is a three-dimensional view of an optical switch of the present invention with independent switching of optical signals at different wavelengths.

Turning now to FIG. 3, an optical switch 300 is shown comprising a phased array 301 for modifying the wavefront, consisting of two sub-arrays 302 and 303; an input port 306 for inputting light at two wavelengths $\lambda_1$ and $\lambda_2$; output ports 308 to 316 for outputting light; and a controller 317 for controlling the array 301 by sending control signals through a link 321. The difference between the switch 300 of FIG. 3 and the switch 100 of FIG. 1 is that the input port 306 emits a polychromatic light wave, or a polychromatic beam of light that is split into two beams 318 and 319 of light at wavelengths $\lambda_1$ and $\lambda_2$, impinging on two sub-arrays 302 and 303, respectively. Each of the sub-arrays 302 and 303 can steer its respective beam at the wavelength $\lambda_1$ and $\lambda_2$, respectively, independently on each other, so as to couple these beams into any of the output ports 308-316. For example, in FIG. 3, a beam 324 at the wavelength $\lambda_1$, reflected from the sub-array 302, is coupled into the output port 308, and a beam 325 at the wavelength $\lambda_2$, reflected from the sub-array 303, is coupled into the output port 312. A crosstalk beam 326 splits from the beam 324 and propagates towards the port 312 causing crosstalk with the beam 325. To suppress the crosstalk, the phase delays of the elements the array 302 are adjusted by the controller 317 so as to send a beam 328 towards the port 312. The beam 328 cancels the beam 326, lessening the crosstalk for the port 312. The physical phenomenon underlying the cancellation is the destructive interference of light waves comprising the beams 326 and 328.

The input port 106 and the output ports 108 to 116 of FIG. 1, the input ports 206 and 207 and the output ports 208 to 216 of FIG. 2, and the input port 306 and the output ports 308 to 316 of FIG. 3 are preferably tips of optical fibers or planar optical waveguides. Alternatively, some of the output ports can be replaced by light blocking elements for blocking light, that is, for preventing light from exiting an optical switch. It is understood and recognized by those skilled in the art that an actual optical switching device will comprise a plurality of collimating and, or focusing elements, wavelength dispersing elements such as diffraction grating, and polarizing elements, for proper optical coupling between the input and the output ports. For example, referring to FIG. 3, a wavelength dispersing element can be used to steer the beams 318 and 319 at wavelengths $\lambda_1$ and $\lambda_2$, respectively, from the common input port 306 towards the respective sub-arrays 302 and 303. The collimating, polarizing, and wavelength-dispersing optical elements are not shown in FIGS. 1 to 3 because the emphasis is made on highlighting the concept of crosstalk reduction according to the present invention.

Figure 4:
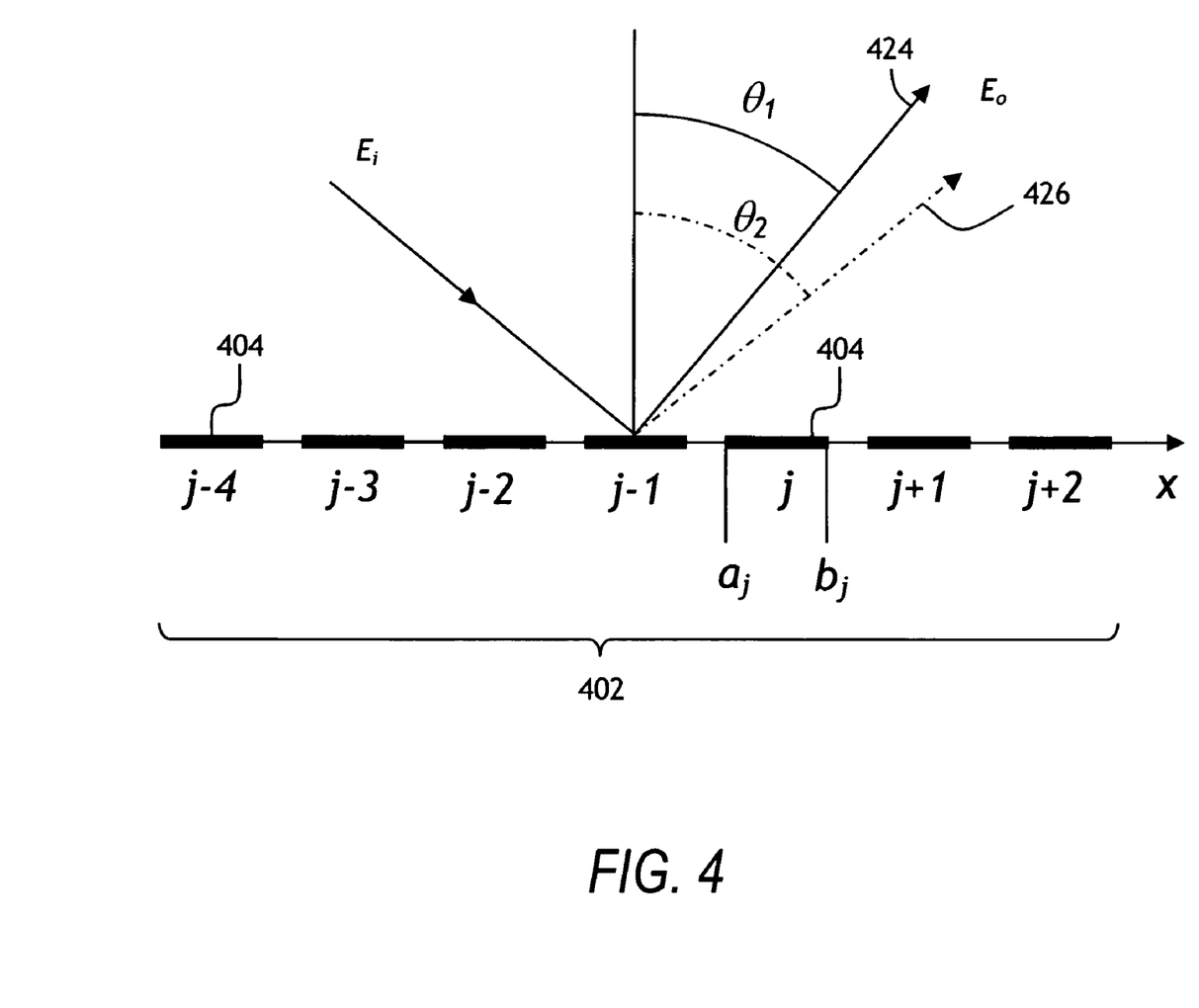
FIG. 4 is a side view of an array of tunable phase delay elements.

The mathematical model illustrating a preferred method of crosstalk reduction in an optical switch according to the present invention will now be described in detail. Referring to FIG. 4, a side view of a linear array 402 of tunable phase delay elements 404 is shown. The array 402 has only one row of elements indexed by a running index j, wherein the index j runs along an x-axis, located in the plane of the array 402. In a preferred embodiment, the fiberoptic switch has singlemode optical fibers or planar waveguides for light input and output. It has been shown by R. E. Wagner and W. J. Tomlinson in an article "Coupling efficiency of optics in single-mode fiber components," Appl. Opt. 21, 2671-2688 (1982), which is incorporated herein by reference, that the coupled optical power in single-mode fiber components and modules can be determined by calculating an overlap integral between optical fields projected from the input and the output fibers onto an intermediate plane, which can be located anywhere in the system. By conveniently locating the intermediate plane at the plane of the array 402, one can evaluate the value of the electric field E of an optical signal coupled from an input single-mode optical fiber into an output single-mode optical fiber as follows:

$$E = C \int_{-\infty}^{\infty} E_i(x, y) E_o(x, y) \, dx \, dy, \quad (1)$$

wherein C is a constant, $E_i(x,y)$ and $E_o(x,y)$ are electric field values of the optical fields projected from the input and the output single-mode fibers onto an xy plane, which is the plane of the array 402, and the integration is performed over the coordinates x and y in the plane of the array 402.

Eq. (1) can be rewritten in a more explicit form upon assuming that the optical power and the phase delay vary only along one coordinate, x, and by considering an angle θ of reflection of a beam at a wavelength λ and a distribution of phase delays φ(x) introduced by the elements 404 of the array 402 along the coordinate x, as follows:

$$E = C \int_{-\infty}^{\infty} E_i(x) E_i(x) e^{i\left(\frac{2\pi x \sin\theta}{\lambda} + \varphi(x)\right)} dx \quad (2)$$

$$= C \int_{-\infty}^{\infty} P(x) e^{-i\left(\frac{2\pi x \sin\theta}{\lambda} + \varphi(x)\right)} dx,$$

wherein P(x) is the input power distribution at the array 402 along the coordinate x.

Further, by taking the constant phase delay across any of the elements 104 out of the integral, one can re-write Eq. (2) as follows:

$$E = C \sum_j \int_{a_j}^{b_j} P(x) e^{-i\left(\frac{2\pi x \sin\theta}{\lambda} + \varphi_j\right)} dx, \quad (3)$$

wherein $a_j$ and $b_j$ are the coordinates of the boundaries of the j-th element 404 of the array 402 introducing a constant delay $\phi_j$ into a corresponding fraction of a wavefront, and the summation is performed over all the elements 404 of the array 402. See FIG. 4, wherein $a_j$ and $b_j$ are explicitly shown.

The integrals in Eq. (3) can be numerically calculated for a given optical power distribution P(x) and a reflection angle $\theta=\theta_1$ of a signal beam 424. The calculated integrals in (3) are complex numbers denoted as $B_{\theta_1,j}$ having a real component, $Re(B_{\theta_1,j})$ and an imaginary component, $Im(B_{\theta_1,j})$. With these new terms, Eq. (3) can be rewritten for the coupled electric field at the angle $\theta_1$ as $$E_{\theta_1} = C \sum_j (\cos\varphi_j + i\sin\varphi_j) \cdot (Re(B_{\theta_1,j}) + i Im(B_{\theta_1,j})) \quad (4)$$

The set of $\phi_j$ can be considered as a set of initial control signals required to send an output beam at the angle $\theta_1$. Even though the values of physical control signals applied to the array elements may not be proportional to the phase delays $\theta_j$, it is assumed herefrom, for simplicity, that the phase delays are the control signals. An actual transfer curve of a tunable phase delay element can be taken into account by suitably programming a controller of the array of tunable phase delay elements, which can be done by a skilled artisan without departing from the spirit and the scope of the present invention.

Since it is expected that the perturbations to the set of initial control signals $\phi_j$ required to cancel a crosstalk beam 426 at an angle of reflection $\theta_2$, are small compared to the initial control signals $\phi_j$, one can linearize Eq. (4) by taking partial derivatives with respect to a k-th phase delay as $$\frac{\partial E_{\theta_1}}{\partial \phi_k} = (-\sin\varphi_k Re(B_{\theta_1,k}) - \cos\varphi_k Im(B_{\theta_1,k})) + \quad (5)$$

$$i(Re(B_{\theta_1,k})\cos\varphi_k - Im(B_{\theta_1,k})\sin\varphi_k)$$

With new definitions:

$$\frac{\partial E_{\theta_1}}{\partial \phi_k} \equiv Re(D_{\theta_1,k}) + i Im(D_{\theta_1,k}) \quad (6)$$

one can write, by taking the summation over all partial derivatives, $$E_{\theta_1} = E_{0,\theta_1} + \sum_j \frac{\partial E_{\theta_1}}{\partial \varphi_j} \cdot \Delta\varphi_j \quad (7)$$

$$= E_{0,\theta_1} + \sum_j \Delta\phi_j (Re(D_{\theta_1,j}) + i Im(D_{\theta_1,j})),$$

wherein $\Delta\phi_j$ are small perturbations of the initial control signals required to obtain an adapted set of control signals suitable for crosstalk suppression, and the partial derivatives are taken at a point corresponding to the values of the initial control signals.

In a similar fashion, for the angle of reflection $\theta_2$ one can write $$E_{\theta 2} = E_{0,\theta 2} + \sum_j \frac{\partial E_{\theta 2}}{\partial \varphi_j} \cdot \Delta \varphi_j \qquad (8)$$

$$= E_{0,\theta 2} + \sum_j \Delta \phi_j (\text{Re}(D_{\theta 2,j}) + i\text{Im}(D_{\theta 2,j}))$$

The requirement to cancel the crosstalk beam 426 can be written as $$\sum_j \Delta \phi_j (\text{Re}(D_{\theta 2,j}) + i\text{Im}(D_{\theta 2,j})) = -E_{0,\theta 2} \qquad (9a)$$

The requirement described by Eq. (9a) is a requirement to send, in a direction corresponding to the reflection angle $\theta_2$, a wave having the same modulus of the complex amplitude as the modulus of the complex amplitude of an initial wave corresponding to the beam 426, and the phase of the complex amplitude opposite to the phase of the complex amplitude of said initial wave.

Similarly, the requirement to have the optical power of the beam 424 unchanged can be written as $$\sum_j \Delta \phi_j (\text{Re}(D_{\theta 1,j}) + i\text{Im}(D_{\theta 1,j})) = 0 \qquad (9b)$$

By introducing weight factors $W_j$ selected to establish a desired proportion between the sought-for perturbations to the initial control signals $\Delta \phi_j$, one can write the following requirement for a weighted sum of perturbations:

$$\sum_j \Delta \phi_j W_j = 0 \qquad (9c)$$

To satisfy Eqs. (9a) to (9c) simultaneously, one can combine them in a matrix equation which, for the two angles $\theta_1$ and $\theta_2$ and five phase delay elements, will have the following form:

$$\begin{pmatrix} \text{Re}(D_{\theta 1,1}) & \text{Re}(D_{\theta 1,2}) & \text{Re}(D_{\theta 1,3}) & \text{Re}(D_{\theta 1,4}) & \text{Re}(D_{\theta 1,5}) \\ \text{Im}(D_{\theta 1,1}) & \text{Im}(D_{\theta 1,2}) & \text{Im}(D_{\theta 1,3}) & \text{Im}(D_{\theta 1,4}) & \text{Im}(D_{\theta 1,5}) \\ \text{Re}(D_{\theta 2,1}) & \text{Re}(D_{\theta 2,2}) & \text{Re}(D_{\theta 2,3}) & \text{Re}(D_{\theta 2,4}) & \text{Re}(D_{\theta 2,5}) \\ \text{Im}(D_{\theta 2,1}) & \text{Im}(D_{\theta 2,2}) & \text{Im}(D_{\theta 2,3}) & \text{Im}(D_{\theta 2,4}) & \text{Im}(D_{\theta 2,5}) \\ W_1 & 0 & 0 & 0 & 0 \\ 0 & W_2 & 0 & 0 & 0 \\ 0 & 0 & W_3 & 0 & 0 \\ 0 & 0 & 0 & W_4 & 0 \\ 0 & 0 & 0 & 0 & W_5 \end{pmatrix} \cdot \begin{pmatrix} \Delta \varphi_1 \\ \Delta \varphi_2 \\ \Delta \varphi_3 \\ \Delta \varphi_4 \\ \Delta \varphi_5 \end{pmatrix} = \qquad (10)$$

$$\begin{pmatrix} 0 \\ 0 \\ -\text{Re}(E_{0,\theta 2}) \\ -\text{Im}(E_{0,\theta 2}) \\ 0 \\ 0 \\ 0 \\ 0 \\ 0 \end{pmatrix}$$

The system of linear equations (10) can be re-written in a general matrix form as $$G \cdot \Delta \phi = Y, \qquad (11)$$

wherein G is a m×n matrix of known values, Y is a vector of m known values, $\Delta \phi$ is a vector composed of n perturbations to the initial control signals of the subset P, and m and n are integer positive numbers.

The system of equations (11) can be over-constrained or under-constrained. It is known that a general solution of Eq. (11) can be found as:

$$\Delta \phi = (G^T G)^{-1} G^T Y, \qquad (12)$$

wherein T stands for an operation of transposition and −1 stands for an operation of inversion of a matrix. In the case of over-constrained system of equations (11), a least-squares solution method may be used. When the matrix G is square, that is, when the amount of unknown perturbations $\Delta \phi_j$ is equal to the amount of individual equations in the system of linear equations (11), an exact solution of the system of equations (11) may exist.

The value of $E_{0,\theta 2}$ in Eq. (9a) or Eq. (10) can be calculated or, preferably, it can be evaluated during a calibration run wherein the complex amplitude $E_{0\theta 2}$ is determined by measuring at least two values of optical power of a signal propagating at an angle of reflection $\theta_2$ at different values of the optical phase delay perturbations. The at least two measured values of optical power are necessary to determine the real and the imaginary components of $E_{0,\theta 2}$.

Figure 5:
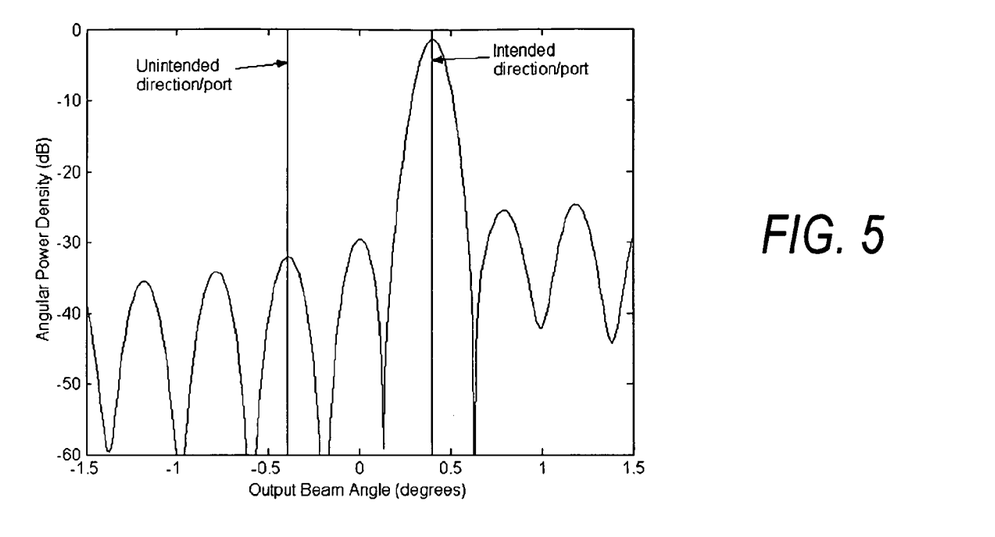
FIG. 5 is a graph showing angular dependence of power density of a beam reflected from the array of tunable phase delay elements, upon applying a pattern of linearly varying optical phase delay to the array.

The results of computer simulations of light coupling according to Eqs. (1) to (12) will now be discussed. Turning to FIG. 5, a calculated angular dependence of power density of the beam 424 of FIG. 4 is shown. The power density reaches its maximum at 0.4 degrees, which is an angle corresponding to the angle $\theta_1$ of FIG. 4. At −0.4 degrees, which is an angle corresponding to the angle $\theta_2$ of FIG. 4, the optical power density is about 30 dB below the maximum point at 0.4 degrees. As has been noted above, the level of −30B of a crosstalk power density is too high for a fiberoptic switch application. By solving the system of linear equations (11), a set of perturbations $\Delta \phi_j$ was found an applied to the array of phase delay elements, so as to cancel the beam 426 of FIG. 4.

Figure 6:
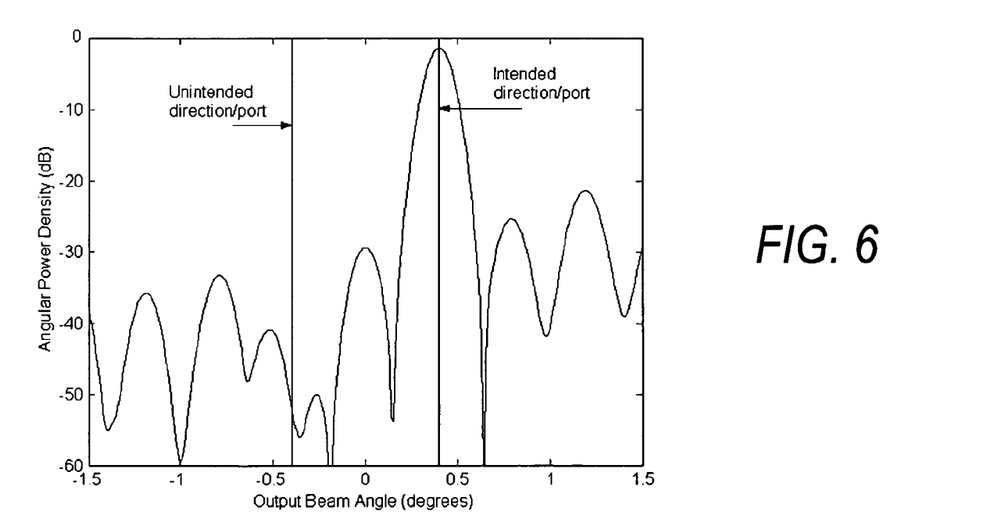
FIG. 6 is a graph showing angular dependence of power density of a beam, upon suppressing propagation of light in one unintended direction.

Turning now to FIG. 6, a result of applying perturbations according to Eq. 12 is shown. An angular dependence of calculated output power density shows a much lower power density, about −50 dB, at −0.4 degrees. Thus, a 20 dB improvement of a crosstalk performance has been demonstrated.

Figure 7:
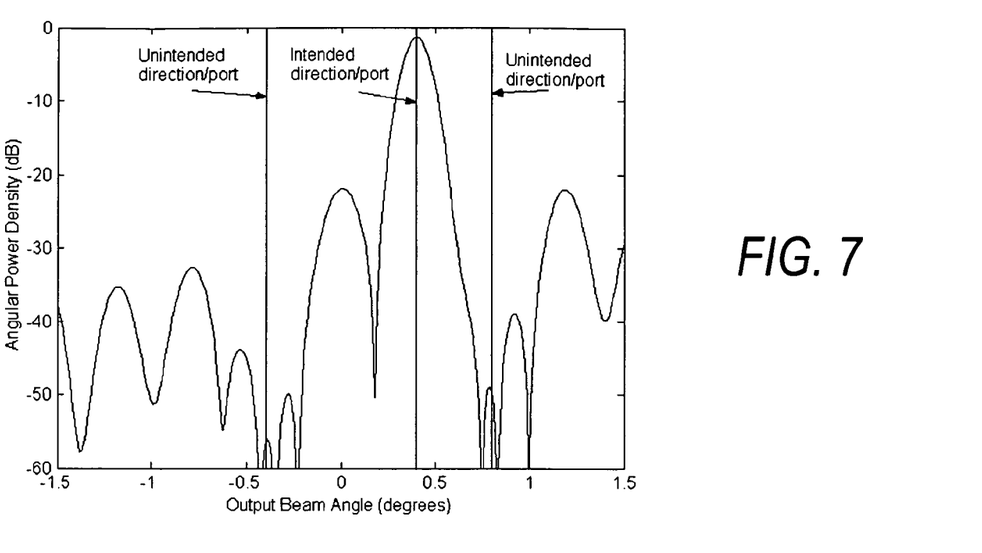
FIG. 7 is a graph showing angular dependence of power density of a beam, upon suppressing propagation of light in two unintended directions.

The method of the present invention can be applied to reduce crosstalk in more than one direction. Turning now to FIG. 7, an angular dependence of output power density is shown for the case of suppressing the crosstalk by suppressing propagation of the light wave at the angles of −0.4 degrees and at 0.8 degrees. The crosstalk suppression in two directions is achieved by constructing the matrix G of the system of linear equations (11) so as to include two sets of requirements expressed by Eq. (9a) instead of one, and by solving the resulting system of linear equations (11).

Figure 8:
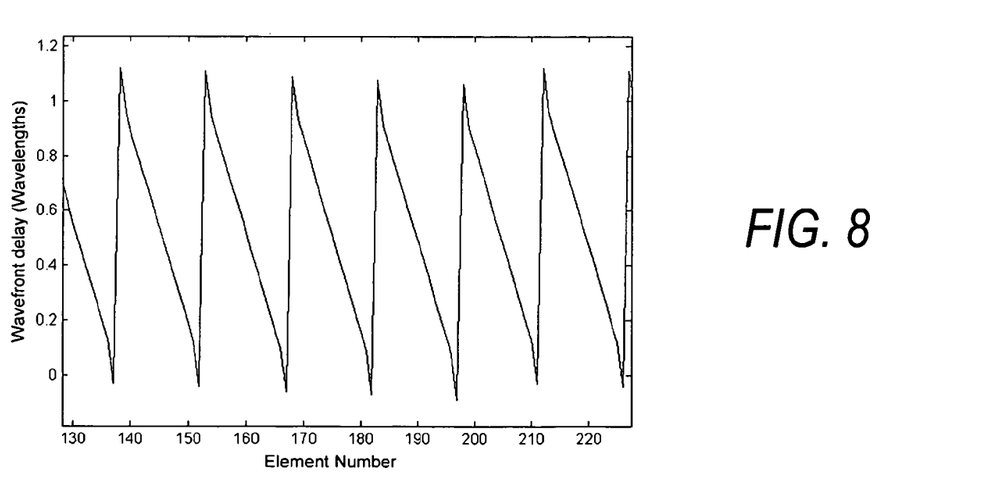
FIG. 8 is a graph showing the values of a wavefront delay introduced by the phase delay elements, required to obtain an angular power density distribution illustrated in FIG. 5.

Turning now to FIG. 8, a graph showing values of the wavefront delay introduced by the phase delay elements, required to steer the beam at 0.4 degrees, is presented. The values are shown in the units of wavelengths. Due to the repeating nature of the wave, a wavefront delay X of more than one wavelength is equivalent to a delay having a magnitude of one wavelength less than the delay X. This is why the pattern of the phase delays of FIG. 8 is a folded sawtooth pattern.

Figure 9:
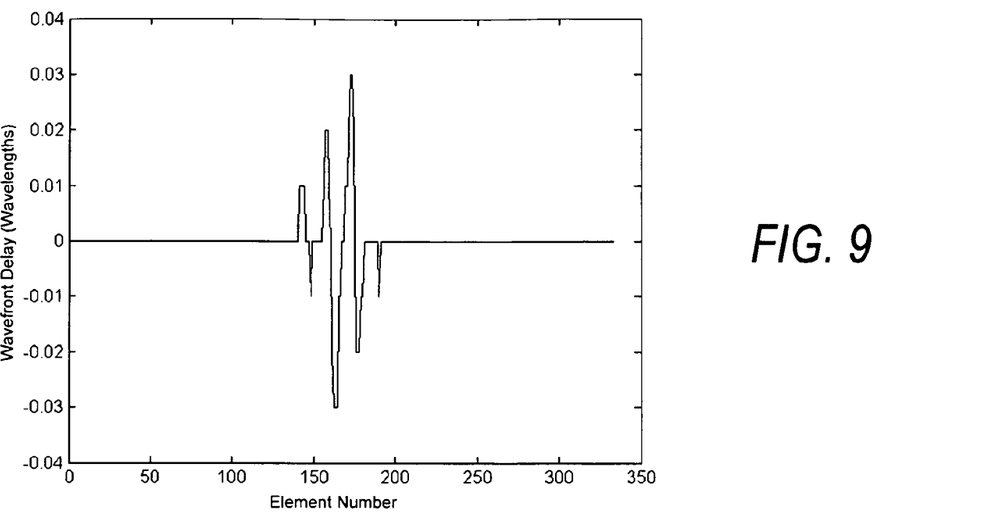
FIG. 9 is a graph indicating perturbations to the values of the wavefront delay of FIG. 8 sufficient to suppress propagation of light in two unintended directions.

Referring now to FIG. 9, a graph indicating a pattern of modifications, or perturbations to the values of the wavefront delay of FIG. 8, is shown. The perturbations of FIG. 9 are sufficient to suppress the crosstalk at the angles of the output light beams equal to −0.4 and 0.8 degrees shown in FIG. 7. The maximum magnitude of the required wavefront delay perturbations is only 0.03 wavelengths. Such a small perturbation may be difficult to control, because the step at which individual phase delays are controlled in a practical array of tunable phase delay elements may be comparable to the value of 0.03 wavelengths, for example, it may be as large as 0.01 wavelengths. Therefore, the pattern of perturbations of the wavefront delay, shown in FIG. 9, may be difficult to realize in practice.

Figure 10:
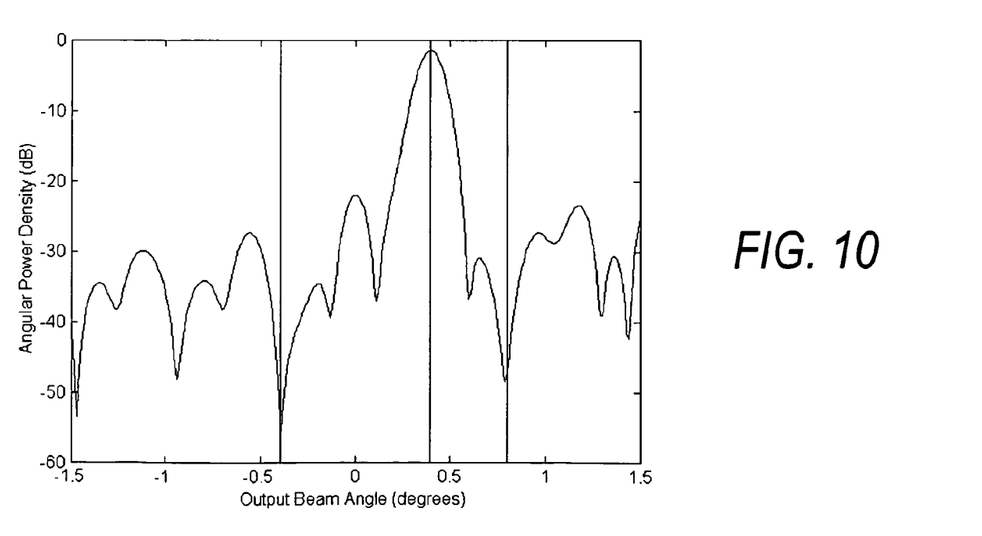
FIG. 10 is a graph showing angular dependence of power density of a beam, upon tuning only a pre-selected subset of phase delay elements corresponding to a lower optical power.
Figure 11:
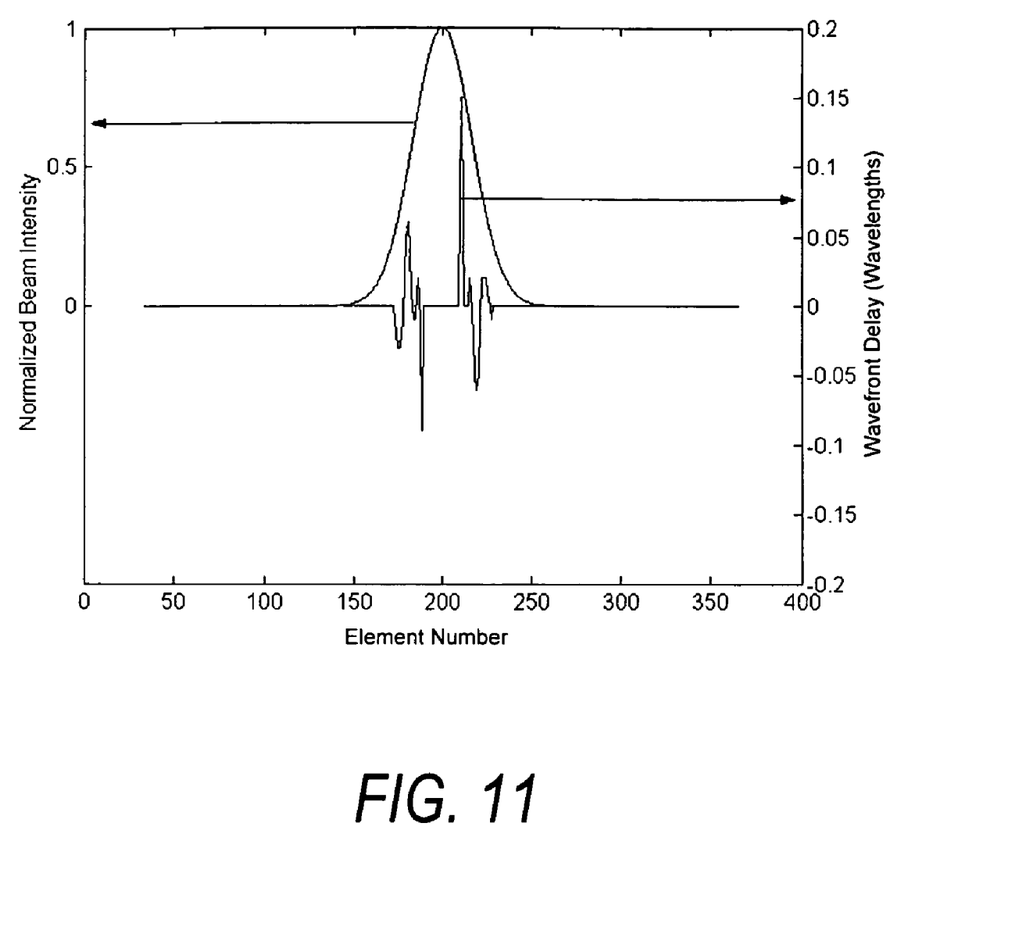
FIG. 11 is a graph showing a relationship between the phase delay element number, the values of a wavefront delay, and the optical power distribution of a beam impinging on the array.

A preferred method of crosstalk reduction, allowing one to relax the phase delay accuracy requirement, includes (a) selecting a subset of phase delay elements corresponding to low linear power density of the incoming optical beam, and (b) perturbing only the phase delays of the elements of that subset. Turning now to FIG. 10, an angular power density distribution of an output beam is shown, wherein the crosstalk at the angles of −0.4 and 0.8 degrees is suppressed to the level of at least −48 dB. Referring now to FIG. 11, the corresponding relationship between the phase delay element number, the values of the wavefront delay, and the linear optical power distribution of a beam impinging on the array, is shown. The perturbations to wavefront delay, shown in FIG. 11, are sufficient to obtain the crosstalk suppression at the angles of −0.4 degrees and 0.8 degrees, illustrated in FIG. 10. The wavefront delay perturbation profile shown in FIG. 11 is much easier to obtain in practice than the profile of FIG. 9 since the magnitude of the required perturbations is between 0.03 and 0.15 waves. Preferably, the perturbations are applied only to the array elements corresponding to optical power density of 50% or lower of the maximum optical power density. In this case, the requirement on the accuracy of a phase delay setting is considerably relaxed.

The presented mathematical formalism can be extended to cover a set of directions for outputting light, and a set of directions for suppressing light. The original set M of directions is given by the device geometry, that is, by the directions corresponding to either output ports or optional beam blocks. The array of tunable phase delay elements may be driven so as to send light in a subset A of the set M, while suppressing light propagation in a subset B of the set M of directions. Furthermore, the controller can be suitably programmed to provide a function of controllably attenuating light propagating in directions belonging to the subset A of directions and, or to cause the light propagating in the subset A of directions have a pre-determined angular power density distribution.

The presented mathematical algorithm can also be applied to improving the accuracy of achieving the pre-determined angular optical power density distribution mentioned in the previous paragraph, by linearizing a system of equations describing the optical power density around an initial set of control signals corresponding to the desired optical power density distribution, in a similar way it was done for Eq. (4) above.

The procedure for finding an adapted set of control signals can be iterated to improve the accuracy of crosstalk suppression and, or reaching a target angular optical power density distribution. The iterative procedure further includes steps of (i) providing the initial control signals equal to the adapted control signals found at a previous iteration; and (ii) repeating steps of determining the perturbations to the initial control signals, required to further suppress the crosstalk and, or reach the target angular optical power density distribution.

The mathematical algorithm presented above can be extended to cover the case of a free-space coupled input and output of an optical switch. In this case, instead of Eq. (2) describing singlemode fiber coupling, the following equation describing a far-field diffraction of plane waves can be used:

$$E = U \int_{-\infty}^{\infty} E_i(x) e^{-i\left(\frac{2\pi x \sin\theta}{\lambda} + \varphi(x)\right)} dx, \tag{13}$$

wherein U is a constant and θ is an angle of diffraction. The Eqs. (4) to (8), (9a) to (9c), (10) and (11) can be accordingly modified by those skilled in the art to take into account Eq. (13) instead of Eq. (2).

The method of the present invention allows one to construct an optical switch having a broadcasting capability, with reduced optical crosstalk between ports. Moreover, the method of the present invention can be applied to driving any phased array of emitters or tunable retarders of a laterally coherent wave radiation, to suppress undesired sidelobes in the angular power spectrum of the emitted radiation.

What is claimed is:

1. A method for causing a light wave, having a complex amplitude and a wavefront, to propagate in a subset A of directions selected from a pre-defined set M of directions, while suppressing propagation of the light wave in a subset B of directions selected from the set M, wherein the method comprises the steps of:
   (a) providing an array of tunable phase delay elements disposed to interact with the light wave, for modifying the wavefront of the light wave in dependence upon control signals for controlling the array elements;
   (b) providing initial control signals for causing the light wave to propagate in the subset A of directions;
   (c) determining an initial complex amplitude of a fraction of the light wave propagating in the subset B of directions upon application of the initial control signals to the array elements;
   (d) determining perturbations to the initial control signals, for sending, in the subset B of directions, a wave having the modulus of the complex amplitude equal to the modulus of the initial complex amplitude, and the phase of the complex amplitude opposite to the phase of the initial complex amplitude;
   (e) applying the perturbations to the initial control signals, so as to produce adapted control signals; and
   (f) applying the adapted control signals to the array elements, so as to modify the wavefront of the light wave and facilitate propagation thereof in the subset A of directions while suppressing propagation thereof in the subset B of directions.

2. A method of claim 1, wherein:
the complex amplitude of the light wave varies across the wavefront; and
the perturbations have a non-zero value only for those control signals which are applied to the array elements that modify a particular fraction of the wavefront, wherein said fraction corresponds to the complex amplitude having a modulus of 50% or less of the modulus of a peak value of the complex amplitude.

3. A method of claim 1, wherein the wavefront of the light wave is substantially flat.

4. A method of claim 1, wherein in step (b), the initial control signals are provided so as to cause the light wave propagating in the subset A of directions have a pre-determined angular power density distribution.

5. A method of claim 1, wherein step (c) comprises measuring at least two parameters corresponding to the complex amplitude of the fraction of the light wave propagating in the subset B of directions.

6. A method of claim 1, wherein each direction of the set M corresponds to a unique output port for outputting the light wave.

7. A method of claim 1, further comprising a step (e1) performed after step (e), wherein the step (e1) comprises the sequential steps of:
(i) providing the initial control signals equal to the adapted control signals produced at step (e); and
(ii) repeating steps (c) to (e).

8. A method of claim 1, wherein step (d) is performed by:
(d1) selecting, from the control signals, a subset P of the control signals for applying the perturbations to;
(d2) linearizing the dependence of the complex amplitude of the light waves propagating in each of the subset A and the subset B of directions on the control signals of the subset P, wherein the linearization is performed around the values of the initial control signals;
(d3) determining the perturbations to the initial control signals of the subset P, by solving a system of linear equations representing the requirement to send, in the subset B of directions, a wave having the modulus of the complex amplitude equal to the modulus of the initial complex amplitude, and the phase of the complex amplitude opposite to the phase of the initial complex amplitude.

9. A method of claim 8, wherein in step (d3), the complex amplitude of the light wave propagating in the subset A of directions is a constant when solving the system of linear equations.

10. A method of claim 8, wherein the system of linear equations comprises the following equation:

$$\sum_j \Delta \varphi_j (\text{Re}(D_{\theta 2, j}) + i \text{Im}(D_{\theta 2, j})) = -E_{0, \theta 2};$$

wherein
$\Delta \varphi_j$ is a perturbation for a j-th initial control signal of the subset P of control signals;
$D_{\theta 2, j}$ is a value of a derivative a complex amplitude $E_{0, \theta 2}$ of a light wave corresponding to a direction $\theta_2$ that belongs to the subset B of directions, wherein said light wave propagates upon application of the initial control signals to the array elements, wherein said partial derivative is taken with respect to the j-th control signal of the subset P of control signals at a point corresponding to the values of the initial control signals; and
the summation is performed over all elements of the subset P.

11. A method of claim 10 wherein the system of linear equations comprises the following equation:

$$\sum_j \Delta \phi_j (\text{Re}(D_{\theta 1, j}) + i \text{Im}(D_{\theta 1, j})) = 0;$$

wherein $D_{\theta 1, j}$ is a value of a partial derivative of a complex amplitude of a light wave corresponding to a direction $\theta_1$ that belongs to the subset A of directions, wherein said light wave propagates upon application of the initial control signals to the array elements, wherein said partial derivative is taken with respect to the j-th control signal of the subset P of control signals at a point corresponding to the values of the initial control signals.

12. A method of claim 10 wherein the system of linear equations comprises the following equation:

$$\sum_j \Delta \phi_j W_j = 0;$$

wherein $W_j$ is a weight parameter assigned to the j-th control signal of the subset P.

13. A method of claim 8, wherein the system of linear equations can be represented by the following equation:

$G \cdot \Delta \phi = Y;$ wherein G is a m×n matrix of known values, Y is a vector of m known values, $\Delta \phi$ is a vector composed of n perturbations to the initial control signals of the subset P, and m and n are integer positive numbers.

14. A method of claim 13, wherein the system of linear equations is either under-constrained or over-constrained.

15. A method of claim 14, wherein the solution of the equation is found as:

$\Delta \phi = (G^T G)^{-1} G^T Y;$ wherein T stands for an operation of transposition and −1 stands for an operation of inversion of a matrix.

16. An apparatus for switching light, comprising:
a set of input ports for inputting a light wave having a wavefront, wherein said set of input ports contains at least one input port;
an array of tunable phase delay elements optically coupled to the set of input ports, for modifying the wavefront of the light wave in dependence upon control signals for controlling the array elements;
a set of output ports for outputting the light wave, optically coupled to the array of tunable phase delay elements, wherein said set of output ports contains at least one output port, and wherein each output port is associated with a direction selected from a set M of directions containing a subset A and a subset B of directions; and
a controller for providing the control signals, programmed to switch light by causing the light wave to propagate in the subset A of directions, while suppressing propagation of the light wave in the subset B of directions, according to the method of claim 1.

17. An apparatus of claim 16, wherein the controller is programmed to provide a function of controllably attenuating light.

18. An apparatus of claim 16, further comprising: a set of input optical waveguides, wherein each input waveguide is optically coupled to an input port of the set of input ports; and a set of output optical waveguides, wherein each output waveguide is optically coupled to an output port of the set of output ports.

19. An apparatus of claim 16, further comprising a set of light blocks for blocking the light wave, optically coupled to the array of tunable phase delay elements, wherein said set of light blocks contains at least one light block, and wherein each light block is associated with a direction selected from the subset A of directions.

20. An apparatus of claim 16, wherein:

the light wave is a polychromatic light wave containing a plurality of substantially monochromatic components;

each phase delay element of the array is disposed to introduce a phase delay only into a wavefront of one particular substantially monochromatic component of the polychromatic light wave;

the controller is programmed to generate control signals suitable for independent switching of the individual monochromatic components of the polychromatic light wave.

21. An apparatus of claim 16, wherein:

the light wave has a complex amplitude varying across the wavefront; and the controller is programmed to suppress propagation of the light wave in the subset B of directions by adjusting only those control signals which are applied to the tunable phase delay elements that modify a particular fraction of the wavefront, wherein said fraction corresponds to the complex amplitude having a modulus of 50% or less of the modulus of a peak value of the complex amplitude.

22. An apparatus of claim 21, wherein:

the light wave is a polychromatic light wave containing a plurality of substantially monochromatic components;

each phase delay element of the array is disposed to introduce a phase delay only into a wavefront of one particular substantially monochromatic component of the polychromatic light wave;

the controller is programmed to generate control signals for independent switching of the individual monochromatic components of the polychromatic light wave.

* * * * *